(12) United States Patent
Kauffman et al.

(10) Patent No.: US 6,511,926 B1
(45) Date of Patent: Jan. 28, 2003

(54) SHEETS FLOORING PRODUCT AND METHOD

(75) Inventors: William J. Kauffman, Manheim, PA (US); Peter A. Christie, Lancaster, PA (US); William B. Saporetti, Lancaster, PA (US); Steven F. Hynicka, Lancaster, PA (US); Ralph W. Wright, Jr., Lancaster, PA (US)

(73) Assignee: AWI Licensing Company, Wilmington, DE (US)

( * ) Notice: Subject to any disclaimer, the term of this patent is extended or adjusted under 35 U.S.C. 154(b) by 0 days.

(21) Appl. No.: 09/234,887

(22) Filed: Jan. 21, 1999

(51) Int. Cl.[7] ............................. B32B 27/02; D06N 3/00
(52) U.S. Cl. ........................ 442/62; 442/72; 442/148; 442/396; 442/394; 428/203; 428/204; 428/337; 428/500
(58) Field of Search ................................ 442/396, 394, 442/62, 148, 378, 72; 428/203, 204, 337, 515, 516, 518, 520, 523, 500; 162/145, 152

(56) References Cited

U.S. PATENT DOCUMENTS

| | | |
|---|---|---|
| 2,759,813 A * | 8/1956 | Feigley, Jr. et al. ......... 162/155 |
| 3,007,808 A | 11/1961 | Smith |
| 3,196,062 A | 7/1965 | Kristal |
| 3,345,234 A | 10/1967 | Jecker et al. |
| 3,658,617 A * | 4/1972 | Fearnow et al. ............ 156/235 |
| 3,804,657 A | 4/1974 | Eyman et al. |
| 3,953,639 A | 4/1976 | Lewicki, Jr. |
| 3,958,043 A | 5/1976 | McKee, Jr. et al. |
| 3,958,054 A | 5/1976 | McKee, Jr. et al. |
| 4,122,224 A | 10/1978 | Brewer et al. |
| 4,128,688 A | 12/1978 | Wiley |
| 4,373,992 A * | 2/1983 | Bondoc ..................... 162/145 |
| 4,440,826 A | 4/1984 | Witman |

FOREIGN PATENT DOCUMENTS

WO    WO 96/04419    * 2/1996

* cited by examiner

*Primary Examiner*—D. Lawrence Tarazano
(74) *Attorney, Agent, or Firm*—Womble Carlyle Sandridge & Rice, PLLC (57) ABSTRACT

A sheet flooring product, including a homogeneous melt processable resin layer formed of a melt processable, non-plastisol layer, and an adjacent felt layer produced by a beater saturated method and having a substantially uniform thickness of between about 5 mils and about 40 mils. The melt processable resin layer is preferably applied by a hot melt calender ("HMC") process to achieve enhanced can drop, refrigerator drag and indentation values.

7 Claims, 6 Drawing Sheets

SHEETS FLOORING PRODUCT AND METHOD

TECHNICAL FIELD AND BACKGROUND OF THE INVENTION

This invention relates to an improved sheet flooring product and a method of providing enhanced performance characteristics to a sheet flooring product. These enhanced performance characteristics include can drop, refrigerator drag and indentation values according to standard product tests performed by applicant, as described below. The flooring products referred to in this application generally include a felt substrate layer and a melt processable resin layer with an overlying foamed vinyl layer which is printed with a desired decorative pattern and/or chemically-embossable texture. Then the foamed vinyl layer is covered with a protective clear coat or wear layer such as a transparent or translucent vinyl plastisol wear layer or melt processed wear layer, and optionally coated with a high-performance surface. The foamed vinyl layer can also be mechanically textured. This type of product can be manufactured according to a number of variant processes, as described below.

The invention according to various preferred embodiments includes a homogeneous, non-plastisol, melt processable resin layer and an adjacent beater saturated felt layer to achieve a laminated or composite structure which exhibits characteristics suitable as a substrate for a sheet flooring product. The melt processable resin layer is formed by any melt processable method including, but not limited to, calendering and extrusion.

The preferred embodiments of the invention utilize a hot melt calendering ("HMC") process. As used in this application, "HMC" refers to the process of formulating a homogeneous mixture containing a resin and preferably plasticizer, stabilizer, filler and other ingredients, heating the mixture and sending it to a calender where the mixture is applied in a precisely controlled thickness to a substrate, such as a felt, to form a laminated sheet.

The embodiments of the invention disclosed herein use a beater saturation process to form the felt substrate which supports the other layers of the sheet flooring during and after manufacture. As used in this application, the beater saturation process refers to a process in which water slurries of fibers and fillers are exposed to latex and chemically induced to destabilize the latex. The latex is thus deposited onto the fibers and fillers rendering the resultant latex-covered flocs capable of paper formation and drainage on a Fourdrinier wire. The process takes place in a cylindrical tank under agitation. It has been found that felt substrates formed by the beater saturation method can be formed in very thin sheets on the order of approximately 10 mils (about 5 mils to about 40 mils) while nevertheless providing good strength and stability to the other layers of the flooring product. Beater saturated felts also permit inexpensive and environmentally safe water-based adhesives to be used for application of the flooring to subflooring with good results. In addition, use of thin felt substrates reduce overall indentation and thus enhance the quality of the flooring while permitting cost-effective manufacturing.

Products made according to the inventive process show surprisingly good can drop, refrigerator drag and indentation test values in comparison with flooring products with plastisol base layers. As explained below, the tests are intended to determine the relative resistance of a flooring product to events which are likely to be encountered during use.

SUMMARY OF THE INVENTION

Therefore, it is an object of the invention to provide a sheet flooring product which exhibits enhanced can drop, refrigerator drag and indent test values.

It is another object of the invention to provide a sheet flooring product which in one embodiment provides a structure including vinyl layers on both sides of a beater saturated felt layer.

It is another object of the invention to provide a sheet flooring product which in one embodiment includes vinyl layers on both sides of a beater saturated felt layer to provide a product having an enhanced point-of-purchase appearance.

It is another object of the invention to provide a sheet flooring product which permits the cost-effective use of fillers and scrap resin containing material including scrap vinyl material.

It is another object of the invention to provide a sheet flooring product which can be successfully applied to a wide variety of subfloors under varying conditions using inexpensive, environmentally safe adhesives.

These and other objects of the present invention are achieved in the preferred embodiments disclosed below by providing a sheet flooring component, comprising (a) a homogeneous melt processable resin layer including a melt processable resin and (b) an adjacent felt layer produced by a beater saturated method and having an average thickness of between about 5 mils and about 40 mils.

According to one preferred embodiment of the invention, the average thickness of the felt layer is between about 8 mils and about 15 mils.

According to another preferred embodiment of the invention, the melt processable resin layer is adhered to the felt layer with an adhesive.

According to yet another preferred embodiment of the invention, the melt processable resin layer is hot melt calendered.

According to yet another preferred embodiment of the invention, the felt layer has a mineral filler content of greater than 60% by weight.

According to yet another preferred embodiment of the invention, the felt layer has a mineral filler selected from the group consisting of clay, talc, dolomite and limestone.

According to yet another preferred embodiment of the invention, the melt processable resin is selected from the group consisting of polyvinylchloride, polyethylene, polypropylene, polystyrene, and copolymers thereof.

According to yet another preferred embodiment of the invention, the melt processable resin is a general purpose polyvinylchloride resin.

According to yet another preferred embodiment of the invention, the melt processable resin layer comprises less than 30 percent by weight of plasticizer.

According to yet another preferred embodiment of the invention, the melt processable resin layer comprises less than 10 percent by weight of plasticizer.

A further embodiment of the invention comprises a sheet flooring product comprising a melt processable resin layer including a melt processable resin, a felt layer produced by a beater saturated method and a wear layer. The felt layer is positioned adjacent to the melt processable resin layer. The sheet flooring product has a residual indent value of less than 10 mils.

According to one preferred embodiment of the invention, the sheet flooring product has a residual indent value of less than 5 mils.

A further embodiment of the invention comprises a sheet flooring product, comprising a melt processable resin layer including a melt processable resin, a felt layer produced by a beater saturated method and a wear layer. The felt layer is positioned adjacent to the melt processable resin layer. The sheet flooring product has a can drop value of at least 20 inches.

A further embodiment of the invention comprises a sheet flooring product, including a melt processable resin layer including a melt processable resin, a felt layer produced by a beater saturated method and a wear layer. The felt layer is positioned adjacent to the melt processable resin layer. The sheet flooring product has a refrigerator drag value of greater than 100 pounds.

A further embodiment of the invention comprises a sheet flooring product including a melt processable resin layer including a melt processable resin, a felt layer produced by a beater saturated method and a wear layer. The felt layer is positioned adjacent to the melt processable resin layer. The melt processable resin layer is substantially uniformly thick.

According to one preferred embodiment of the invention, the sheet flooring product includes a second resin layer.

According to one preferred embodiment of the invention, the second resin layer is foamed.

According to one preferred embodiment of the invention, the second resin layer is positioned adjacent to the melt processable resin layer.

According to one preferred embodiment of the invention, the second resin layer overlies the melt processable resin layer.

A further embodiment of the invention comprises a sheet flooring product including a felt layer which is produced by a beater saturated method, a melt processable resin layer formed of a melt processable resin adjacent one side of the felt layer adjacent, and a second resin layer adjacent the other side of the felt layer.

According to one preferred embodiment of the invention, the second resin layer is a foamed resin layer.

An embodiment of a sheet flooring component according to the invention comprises the steps of forming a felt layer by a beater saturated method and applying a melt-processable, non-plastisol layer to the felt layer wherein the felt layer has an average thickness of between about 5 mils and about 40 mils.

According to one preferred embodiment of the invention, the average thickness of the felt layer is between about 8 mils and about 15 mils.

According to yet another preferred embodiment of the invention, the melt processable resin layer is applied to the felt layer by calendering.

Another embodiment of the method of manufacturing a sheet flooring product comprises the steps of forming a layer including a melt processable resin and forming a felt layer produced by a beater saturated method. The melt processable resin layer and the felt layer are positioned in adjacent relation to each other. The melt processable resin layer and the felt layer are bonded to each other. A foamable resin layer, preferably a plastisol layer, is optionally applied to the melt processable resin layer. A wear layer is applied to the melt processable resin layer or the foamable resin layer.

According to one preferred embodiment of the invention, the sheet flooring product produced from the bonded felt layer and melt processable resin layer has a residual indent value of less than 10 mils.

According to yet another preferred embodiment of the invention, the sheet flooring product has a can drop value of at least 20 inches.

According to yet another preferred embodiment of the invention, the sheet flooring product has a refrigerator drag value of greater than 100 pounds.

Another embodiment of the method of manufacturing a sheet flooring product comprises the steps of forming a felt layer produced by a beater saturated method, applying a foamable resin layer, preferably a plastisol layer, to one side of the felt layer adjacent, and applying a wear layer to the foamable plastisol layer. A melt processable resin layer is formed and the melt processable resin layer is bonded to the other side of the felt layer.

According to one preferred embodiment of the invention, the sheet flooring product has a residual indent value of less than 10 mils.

According to yet another preferred embodiment of the invention, the sheet flooring product has a can drop value of at least 20 inches.

According to yet another preferred embodiment of the invention, the sheet flooring product has a refrigerator drag value of greater than 100 pounds.

According to another preferred embodiment of the invention, the method includes the step of printing a pattern onto the melt processable resin layer.

According to another preferred embodiment of the invention, the method includes the step of coating the printed layer with a transparent or translucent vinyl plastisol.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DESCRIPTION OF THE PREFERRED EMBODIMENT AND BEST MODE

Figure 1A:
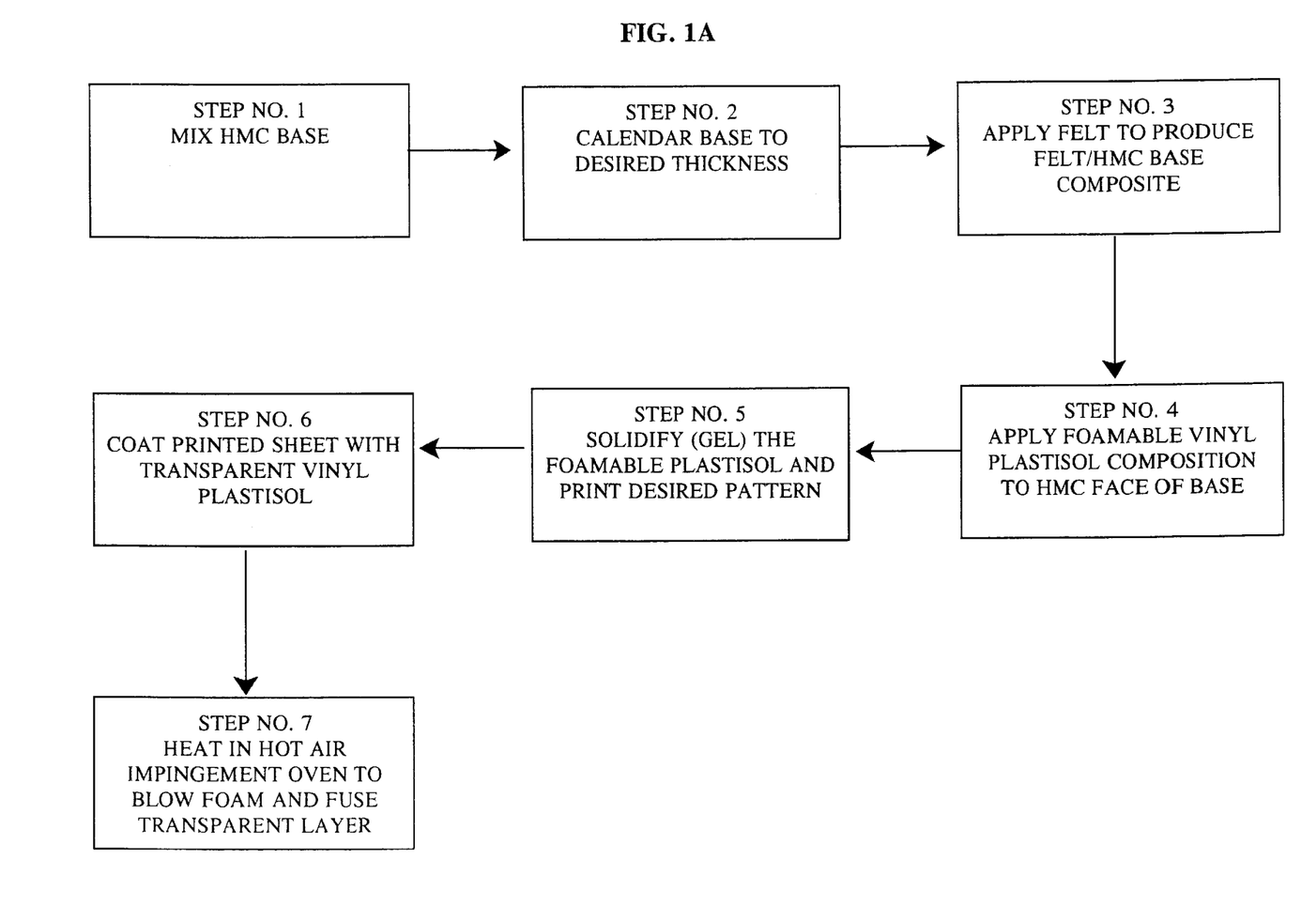
FIG. 1 is a schematic flow diagram showing production of an embodiment of the present invention.
Figure 2A:
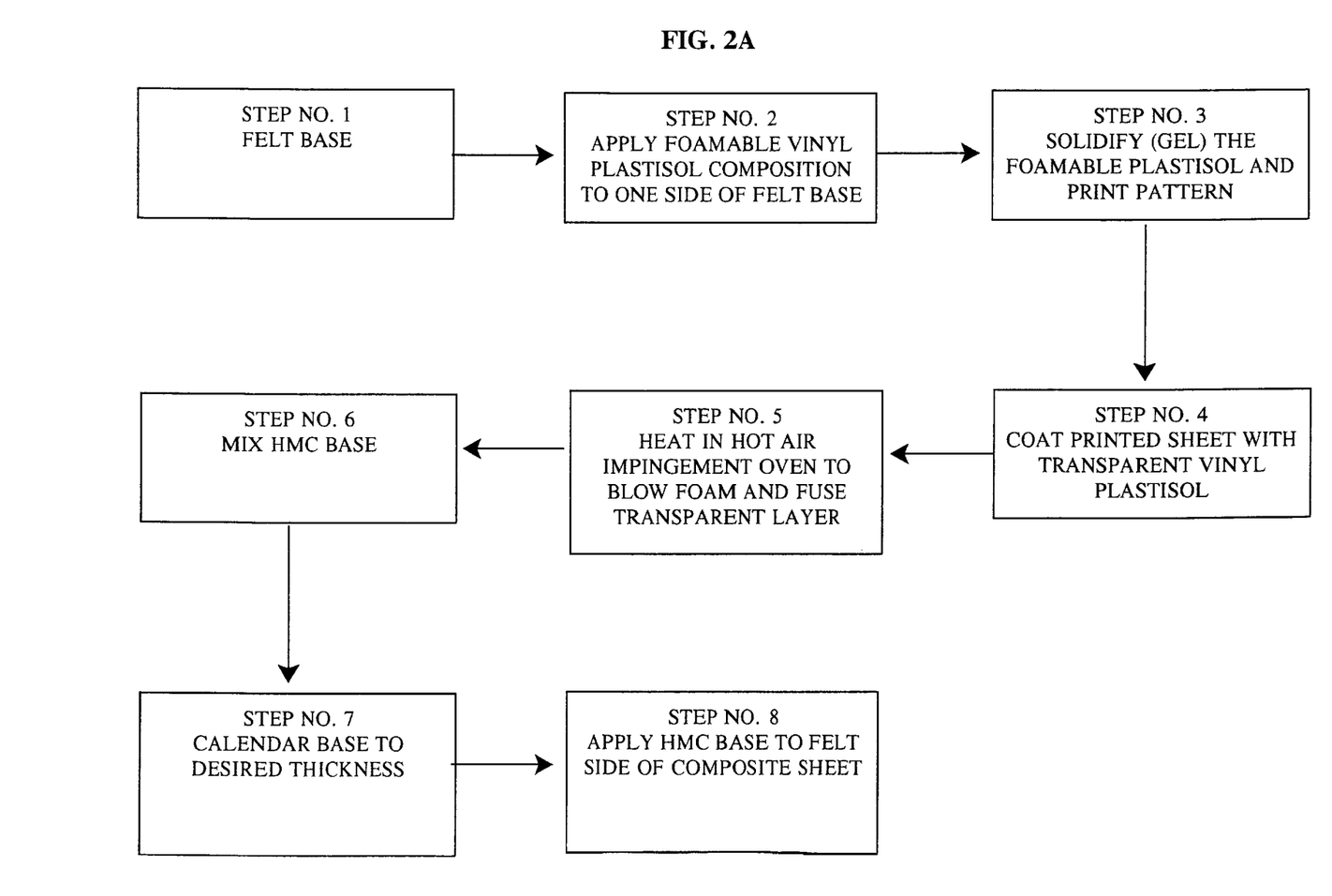
FIG. 2A is a schematic flow diagram showing production of another embodiment of the present invention.
Figure 3A:
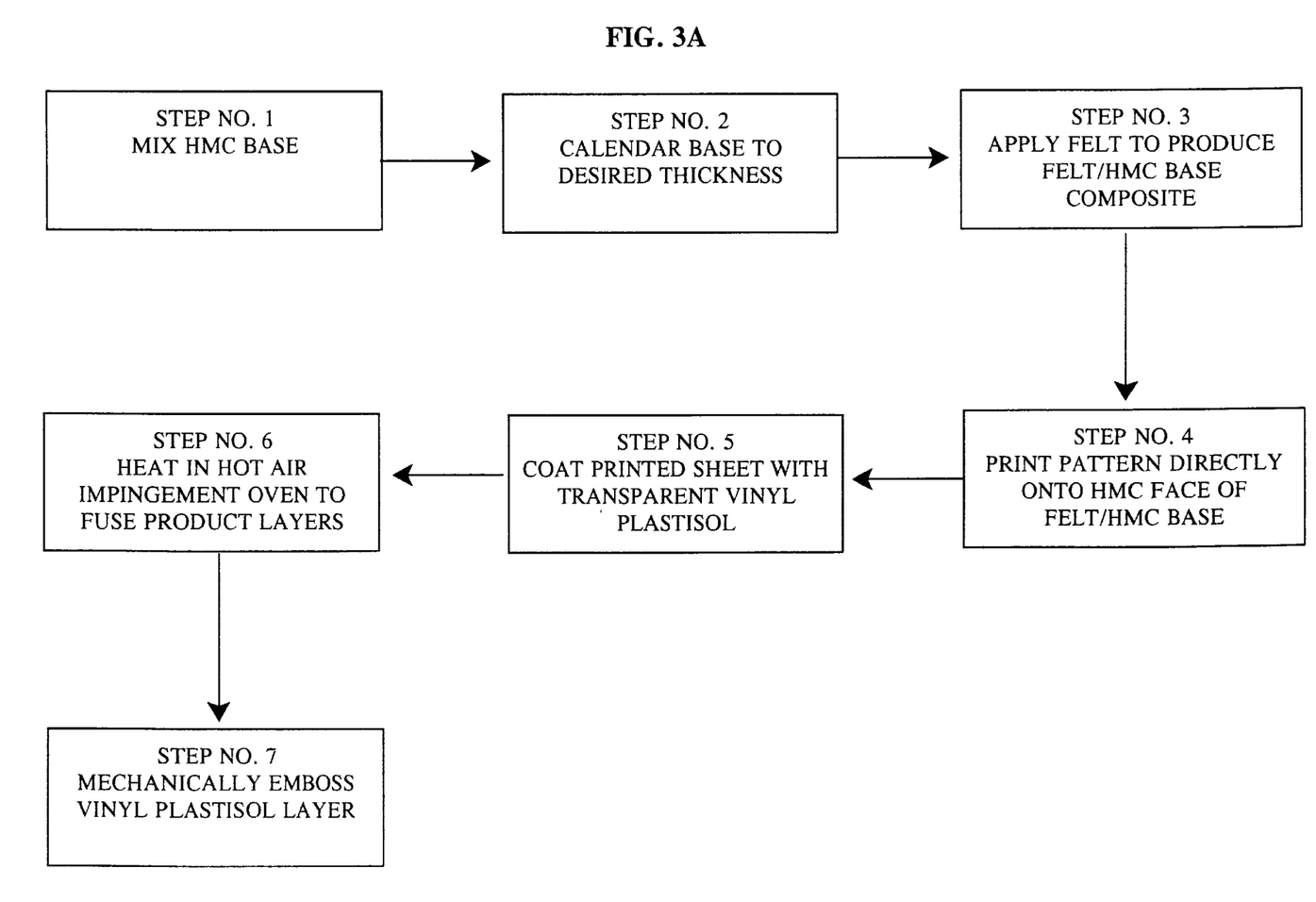
FIG. 3A is a schematic flow diagram showing production of another embodiment of the present invention.

Referring now specifically to the drawings, methods of producing sheet flooring products according to three embodiments of the invention are illustrated and explained in FIGS. 1A, 2A and 3A.

Figure 1B:
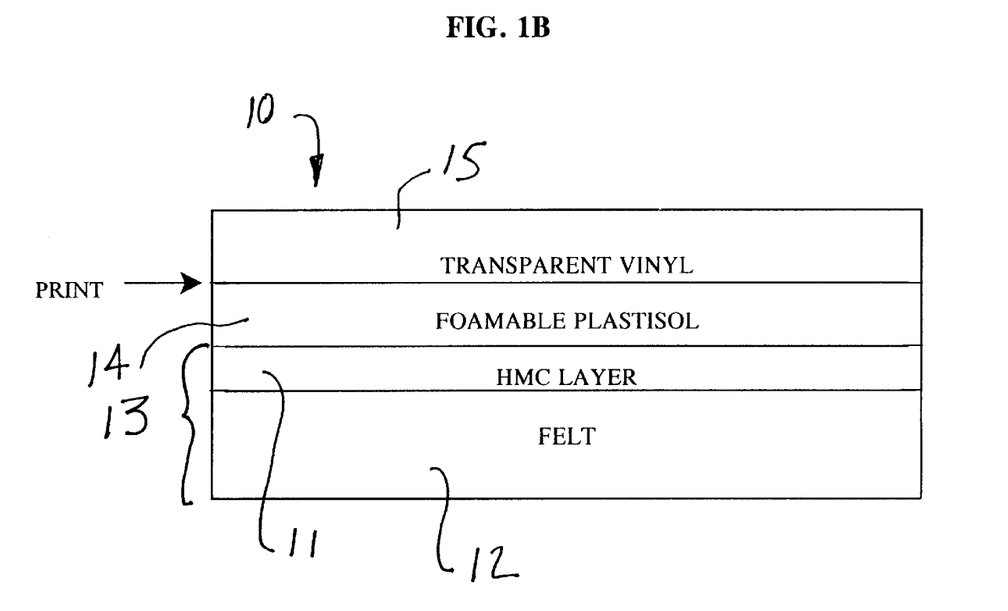
FIG. 1B is a schematic cross-sectional diagram of a sheet flooring product made according to the process illustrated in FIG. 1A.

Referring specifically to FIGS. 1A and 1B, formation of the flooring product 10 is shown. The constituents of a HMC layer 11 are mixed in a mixer, Step 1, and fed into a calender at a desired mix temperature in Step 2. The nip opening of the calender is adjusted to the desired thickness of HMC layer 11, and, in Step 3, the HMC layer 11 is melt-coated directly onto a heated beater saturated felt 12 by bringing the felt 12 into contact with a calender transfer roll in a continuous process to form a laminated HMC/felt base 13. See FIG. 1B.

This HMC/felt base 13 can also be produced by bringing the HMC layer 11 into contact with the heated felt layer 12 downstream from the calender, if desired. Three preferred formulations for the HMC layer 11 are set out below in Example 1, HMC Formulation Nos. 1A, 1B and 1C.

According to Process Step 4, a foamable vinyl plastisol layer 14 is coated onto the HMC layer 11 of the HMC/felt base 13 with a reverse roll coater. The plastisol layer 14 is then solidified (gelled) by bringing it into contact with a hot drum and is then decorated with standard rotogravure ink compositions in a selected design using inhibitor and non-inhibitor compositions according to known processes in Step 5. Other decorative layers known in the art, such as colored particulate, or other ink printing processes, including ink jet printing, may used rather than the rotogravure inks. A transparent vinyl plastisol wear layer 15 is then coated onto the printed foam plastisol layer 14 by reverse roll coating in Process Step No. 6. The laminated HMC/felt base 13 and overlying printed plastisol layer 14 and transparent plastisol layer 15 are then heated in an air impingement oven at a temperature to heat the surface of the foamable vinyl plastisol layer 14 sufficiently to initiate the foaming reaction in Process Step No. 7, thus producing the chemically embossed sheet flooring product 10. See Example No. 2.

Alternative embodiments wherein a non-foamable plastisol layer is pad-coated onto the HMC layer 11 of the HMC/felt base 13 and solidified are explained in Example Nos. 3 and 4, not illustrated.

Figure 2B:
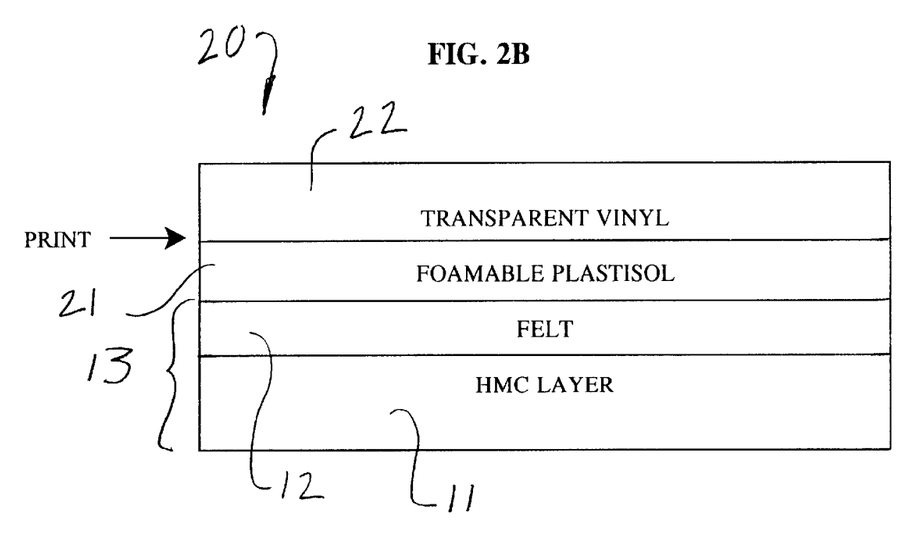
FIG. 2B is a schematic cross-sectional diagram of a sheet flooring product made according to the process illustrated in FIG. 2A.

Referring now to FIGS. 2A and 2B, formation of a sheet flooring product 20 is shown. First, the foamable plastisol layer 21 of Example No. 2 with a thickness of 10 mil is applied to a 10 mil beater saturated felt 12 and gelled as illustrated in Steps 1, 2 and 3. The surface of the gelled foamable plastisol 21 is printed with a rotogravure ink design or decorated with other decorative layers known in the art, Step 3, and subsequently coated with a 10 mil thick transparent vinyl plastisol wear layer 22 in Step 4. The structure is then fused in an air impingement oven in Step 5 under the same conditions as described in Example No. 2.

Thereafter, the HMC formulation 1 A of Example No. 1 is processed in the high intensity mixer at Step 6. A 25 mil HMC layer 11 is calendered to the proper thickness in Step No. 7 and brought into contact with the exposed felt side of the felt layer 12 and coated thereon to form a HMC/felt base 13 at Process Step 8. The sheet flooring product 20 therefore has a felt layer 12 coated on both sides by resin compositions-the HMC layer 11 on one side and the foamable plastisol layer 21 on the opposite side. Thus, the felt layer 12 is an internal structure not visible to the customer. See Example 5.

Figure 3B:
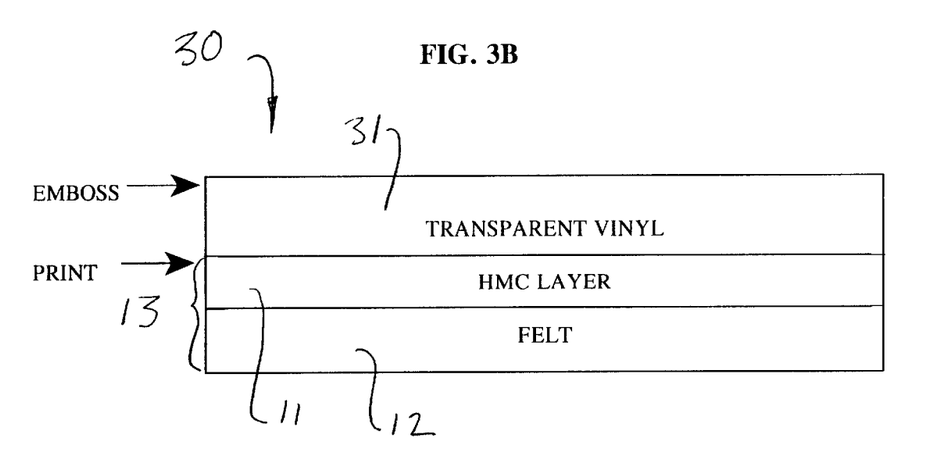
FIG. 3B is a schematic cross-sectional diagram of a sheet flooring product made according to the process illustrated in FIG. 3A.

Referring now to FIGS. 3A and 3B, formation of a sheet flooring product 30 according to another embodiment of the invention is shown. After formation of the HMC/felt base according to Steps 1, 2 and 3 of FIG. 3A, the HMC layer 11 of the HMC/felt base 13 is directly printed with a rotogravure ink design or decorated using other decorative techniques known in the art at Step 4. Optionally a pad coat, typically white, can be applied to the HMC face before the decoration.. A transparent vinyl plastisol wear layer 31 is then applied over the decorated HMC layer 11 at Step 5, and then heated in a hot air impingement oven to fuse the product layers, at Step 6. The vinyl plastisol wear layer 31 is then mechanically embossed by bringing the surface of the layer 31 into contact with a metal embossing roll as it exits the oven at Step No. 7. See Example No. 4.

The performance characteristics of the flooring products according to the invention, such as products 10, 20 and 30, are quantified using the following standard can drop, refrigerator drag and indentation tests:

Can Drop Test

The purpose of the can drop test is to simulate the type of impact on the wearing surface of the sheet flooring product which results from the dropping of heavy objects such as filled food and beverage cans. A projectile is used which weighs 13 ounces and has a core-hardened steel edge shaped like the lip of a 13 ounce can of Campbell's soup. The projectile is constructed with two ball bearing rollers to assure a free fall.

An indexing pointer is mounted on the front of the projectile to indicate the height of drop. Two parallel flat metal upright posts approximately 63 inches long guide the projectile. These posts are mounted perpendicularly to a steel base plate. A scale graduated in increments of ¼ inch mounted on one upright post for the purpose of indicating the drop height. A 5-⅞×5-⅞ piece of ¼ inch tempered Masonite, on which the specimen is placed during the test, is laid loose in a recessed area on the steel base plate, rough side up. A Flash-Q-Lens Magnifier or equivalent is utilized for examining specimen for evidence of failure.

A minimum of three specimens are cut, approximately 4 inches in the across machine direction by 6 inches in the machine direction. A specimen, wearing surface up, is placed on the Masonite base. The projectile is dropped with its length parallel to the machine direction. Three determinations are made. The projectile is dropped in 10 inch increments until a failure occurs, then three drops are made at this height. If three failures occur, the projectile is moved 5 inches lower. Drops continue at progressively lower heights in 5 inch increments until three passing tests are obtained at a given height.

If only one or two failures occur at a given height, the projectile is dropped from progressively higher distances at 5 inch increments until three failures occur, then three passing heights are obtained. The specimen is moved to a new position each time the projectile is dropped so that repeated impacts do not occur on top of each other. The specimen is examined after each drop for evidence of failure of wear surface. Failure is defined as any cracking, cutting, or separation of the wear layer that can be seen after close visual examination. It may be necessary to use a magnifier to aid in a more accurate examination. All failing and passing heights are reported in inches. For example, a can drop value of 20 inches indicates that 20 inches is the greatest height at which 3 passing tests occurred. This test is documented in applicant's Test Method TM 174, R. 4, dated Jul. 24, 1989.

Refrigerator Drag Test

The purpose of the refrigerator drag test is to determine a sheet flooring product's resistance to tearing when an appliance foot is dragged or pushed across its surface. Samples are subjected to one (1) pass of a refrigerator foot mounted on an aluminum base and attached to a slide apparatus at a given weight. The foot used is a standard refrigerator leveling foot that has six sides with rounded corners. The maximum dimension is 1.5 inches from a point at the juncture of any two adjacent sides through the center to the opposite point.

Four (4) 5-inch wide×20-inch long specimens of a given sheet flooring product are prepared, with the 20-inch length in the machine direction. The sheet flooring product should be adhered to a subflooring material according to appropriate installation procedure. A 2-inch strip of double-faced cloth carpet tape is placed on the back of each specimen over its entire length, in the center of the specimen.

The slide apparatus moves along the surface of the specimen at the rate of 30 inches in five seconds. The specimens are affixed to the slide table so that refrigerator foot will slide down the middle of the specimen. The refrigerator foot bar is secured to slide wells. The weight plates are lowered onto the specimen. The weight may be allowed to rest on the specimen for 20 seconds before start of the test.

Additional weight is added onto the top of the weight plates to make a combined weight of 96 pounds. The minimum weight is 16 pounds. The maximum weight is 156 pounds. The testing apparatus is activated and a single pass of the refrigerator foot is made down the length of the specimen. The weights are removed from the apparatus and refrigerator foot is moved back to the starting point.

The specimen is inspected for any failure, i.e., any break in wear surface. Weight is added or subtracted according to results up to 156 pounds or down to 16 pounds. The weight at which tearing takes place is noted, and this represents the reported value. This test is documented in applicant's Test Method TM 306, R. 1, dated Jun. 26, 1996.

Indent Test

The purpose of the indent test is to obtain a quantitative measure of the resistance of a sheet flooring product to indentation. Samples are subjected to the prescribed pressure in pounds per square inch for a given amount of time. The depth of indentation and amount of residual indentation are recorded.

The specimens are conditioned for 24 hours at 73.4° F. and relative humidity of 50% RH. An indentation machine which operates in accordance with the above-identified standards is used to test the samples. A specimen at least 2×4 inches is used. No test should be made within ½ inch of any edge of the specimen. The thickness of each location to be indented on the specimen is measured and recorded. The specimen is then placed flat on the base plate of the indentation machine. An indentor foot (having a flat circular bottom of 0.282 inch diameter) on the indentation machine is lowered gently without impact until it contacts the surface of the specimen where the thickness measurement was made, applying an initial load of one pound. The dial indicator is adjusted to zero and an additional 120 pound load applied to the specimen within one or two seconds.

At the end of 10 minutes of application of the load, the indentation is read from the dial indicator, the load removed and the value recorded to the nearest 0.001 inch. Upon removal from the indentation machine, the specimen is laid flat for 24 hours and a thickness measurement is made at the same spot where the original thickness was measured and the amount of residual indentation is calculated by subtracting this measurement from the original thickness. Three determinations are made for each specimen. Thus, a residual indent value of less than 5 mils indicates that residual indentation of the sample was less than 0.005 inches. The test is based on Federal Test Method Standard 501a, Methods 3221 and 3231 dated Jun. 15, 1966, and is documented in applicant's Test Method TM 48, dated Dec.5, 1967.

EXAMPLE NO. 1

Preparation of HMC/Felt Base

This example describes felt/HMC composites that will form the basis of additional examples, as well as set out the potential ranges of compositions for this composite layer. In this and other examples a predetermined order of method steps has been followed. However, the order of method steps described in these examples and in the following method claims may be altered, the purpose of the method claims being to claim an efficient commercial basis for producing the products also described and claimed in this application without regard to the order in which the steps take place.

The following formulations of raw materials were compounded in a high intensity mixer, and fed into a calender (top roll 340° F., transfer roll 350° F.) at a mix temperature of 380° F. The HMC formulation was melt coated directly onto a beater saturated felt radiant heated to 200 ° F. by bringing it in contact with the calender transfer roll. This calender nip opening was adjusted so that the desired thickness of HMC layer was applied directly to the felt. This composite could also be produced by bringing the HMC layer into contact with the heated felt by lamination downstream from the calender if desired.

| HMC Formulations: | 1A | 1B | 1C |
| --- | --- | --- | --- |
| General purpose PVC Homopolymer Resin or scrap vinyl resin/film K = 66 | 25.9% | 26.7% | 20.4% |
| Primary phthalate plasticizer | 10.5% | 10.5% | 7.2% |
| Epoxidized Soya oil | 0.8% | — | — |
| Calcium/zinc stabilizer | 1.3% | 1.3% | 1.0% |
| Acrylic processing aids | 1.5% | 1.5% | 1.2% |
| Limestone filler | 60.0% | 60.0% | 70.2% |

EXAMPLE NO. 2

Preparation of Sheet Flooring Product

A 10 mil foamable vinyl plastisol composition (2:1 blow ratio) was coated with a reverse roll coater onto HMC side of the felt/HMC base composite of example No. 1A, where the felt was a nominal 10 mils and the HMC layer a nominal 25 mils in thickness, and solidified (gelled) by bringing it in contact with a hot drum at 300° F.

| Foamable Plastisol Formulation | |
| --- | --- |
| PVC homopolymer foam dispersion resin - K65 | 31.5% |
| PVC homopolymer blending resin | 25.7% |
| Limestone filler | 12.6% |
| TiO2 | 3.2% |
| Activated blowing agent | 0.9% |
| Primary Phthalate plasticizer | 22.6% |
| Hydrocarbon diluent | 2.8% |
| Epoxidized Soya oil | 0.7% |

This gelled foamable layer was subsequently printed with standard rotogravure ink compositions in a selected design using inhibitor and non-inhibitor compositions. A 10 mil thick transparent vinyl plastisol composition was coated onto this printed composite by reverse roll coating, and the entire composite was heated in an air impingement oven such that the surface temperature of the composite reached 370° F., thereby expanding the foamable plastisol layer to produce a chemically embossed flooring structure. This product gave a can drop value of over 30 inches, a refrigerator drag value of 156 pounds and an indent value of less than 5 mils.

EXAMPLE NO. 3

HMC Coating on 10 mil Felt

This example used a 40 mil HMC coating composition as described in example No. 1B on a 10 mil felt. The formation of the HMC/felt base composite was as described in Example No. 1. To the HMC side of the composite a non-foamable white plastisol pad coat was applied using a reverse roll coater. The pad coat was solidified (gelled) by bringing it into contact with a 300° F. hot drum. A 10 mil layer of a transparent vinyl plastisol composition was then applied by a reverse roll coater and the entire composition heated in an air impingement oven to fuse the structure. The resulting product gave a can drop value of 35 inches, a refrigerator drag value of 156 pounds and residual indent values of less than 5 mils.

EXAMPLE NO. 4

Printed HMC Layer

Example No. 3 was repeated, except that the HMC base layer was printed with a pattern using rotogravure printing with no use of inhibitor inks. After the transparent vinyl plastisol was applied, and heated to fuse the product, it was mechanically embossed by bringing the surface in contact with a metal embossing roll as it exited the oven according to normal practice.

EXAMPLE 5

Sheet Flooring Product With Internal Felt Layer

This example describes a sheet flooring product that incorporated the 10 mil beater saturated felt layer in the middle of the structure. The foamable plastisol of Example No. 2 with a thickness of 10 mil was applied to a 10 mil beater saturated felt and gelled as in Example No. 2. The surface of the gelled foamable plastisol was printed with the same rotogravure ink design of Example No. 2, subsequently coated with a 10 mil thick transparent vinyl plastisol, and fused in an air impingement oven at the same conditions described in Example No. 2. The HMC layer was then formulated and applied to this structure.

The HMC formulation of example 1A was processed in the high intensity mixer under the same conditions as Example No. 1. However, the HMC layer was brought in contact with the felt side of the above composite and a 25 mil HMC layer transferred/coated onto the felt side of the composite. The resultant product had the felt layer coated on both sides by vinyl compositions. This structure gave a can drop value of 30 inches, a refrigerator drag value of 156 and residual indents value of less than 5 mils. Equivalent results were achieved with the HMC formulation 1B of Example 1.

EXAMPLE NO. 6

High Fill Value HMC Layer

This example illustrates the use of a thicker felt, a higher filler level in the HMC layer and a plasticizer level in the HMC layer below 10%. An HMC composition described in Example No. 1C was formed into an HMC/felt base composition according to the procedure described in Example 1 using a felt with a thickness of 28 mils and an HMC layer of 20 mils. A reverse roll coater was used to apply an 8 mil thick foamable plastisol gel composition onto the HMC side of the base composite. The gel composition has the following formula:

| PVC homopolymer foam dispersion resins (K = 65) | 32.6% |
| --- | --- |
| PVC homopolymer blending resin | 15.5% |
| Limestone filler | 22.1% |
| TiO2 | 3.6% |
| Activated blowing agent | 0.7% |
| Barium stabilizer | 0.4% |
| Primary phthalate plasticizer | 16.7% |
| Ester diluent | 4.3% |
| Epoxidized soya oil | 0.6% |
| Hydrocarbon diluents | 3.5% |

After application, the plastisol was solidified (gelled) on a hot drum surface at 300° F. A 10 mil thick transparent vinyl plastisol composition was coated onto the surface of the gelled surface using a reverse roll coater, and the entire composition was heated in a hot air impingement oven to fuse the structure. The resulting material was found to give a can drop value of 30 inches, a refrigerator drag value of 156 pounds and residual indent value of under 5 mil.

In general, the formulation of the HMC layer contains PVC resin, plasticizer, stabilizer, filler and some minor ingredients. The raw materials can be pre-mixed together below the fusion temperature then sent to a compounder to be fused, or can be fed into a compounder without premixing. The compounded material then is sent to a calender to form a sheet, which can be further processed to form flooring products. HMC formulae according to the invention fall within the parameters set out below:

| PVC resin: | 16% to 70% |
| --- | --- |
| Plasticizer: | 5% to 25% |
| Limestone: | 0% to 75% |
| Stabilizer: | 1.5% to 5.5% |
| Minor ingredients: | 0.5% to 2.5% |

The minor ingredients may include stabilizers, process aids, release agents and modifiers.

COMPARATIVE EXAMPLE NO. 7

To show the difference in the performance of a flooring structure made with a filled calender layer, as disclosed and explained above, as opposed to a filled plastisol layer containing a comparable amount of limestone filler, two constructions were produced. The first (STRUCTURE 1) was produced using a nominal 10 mil felt coated with a limestone filled PVC plastisol. The formula for this filled plastisol coating is as follows:

| Filled Plastisol | |
| --- | --- |
| PVC Plastisol resin | 20.4 pounds |
| Primary Phthalate Plasticizer | 15.5 |
| Limestone | 58.4 |
| Hydrocarbon diluent | 2.9 |
| Barium stabilizer | 1.4 |
| Hexadecene | 1.4 |
| Total | 100 pounds |

This filled plastisol was applied to the felt and fused on a heated drum to give a 20 mil thick layer. A foamable plastisol of the following formula was then applied to the filled plastisol layer and gelled on a hot drum.

| Foamable Plastisol | | |
|---|---|---|
| PVC Plastisol resin | 48.2 | pounds |
| Primary phthalate plasticizer | 20.6 | |
| Epoxidized soy oil | 0.7 | |
| Limestone | 20.2 | |
| Diluents | 3.4 | Sum of phthalate and diluents |
| Barium stabilizer | 0.4 | is equal to 24.0 |
| Titanium dioxide | 5.5 | |
| Activated blowing agent | 1.0 | |
| Total | 100 | pounds |

A final pass was made to apply 10 mil of a plastisol wear layer of the following formula.

| Plastisol Wear Layer | |
|---|---|
| PVC Plastisol resin | 69.0 pounds |
| Primary phthalate plasticizer | 15.9 |
| Epoxidized soy oil | 12.8 |
| Calcium/zinc stabilizer | 1.7 |
| Total | 100 pounds |

The entire structure was then fused in a hot air impingement oven to blow the foam and fuse the wear layer. A structure with a nominal 20 mils of expanded foam resulted. This is a 2:1 blow ratio. When tested, this structure showed a can drop value of 15 inches, a refrigerator drag value of 96 pounds and a residual indent of 5 mils.

For comparison, a structure (STRUCTURE 2) was made using a filled hot melt calendered layer in place of the filled plastisol layer. The formula for the filled hot melt calendered layer is as follows:

| Hot melt calendered layer | |
|---|---|
| PVC Resin | 27.0 pounds |
| Primary phthalate plasticizer | 10.7 |
| Limestone | 59.4 |
| Stabilizers | 1.4 |
| Processing aids | 1.5 |
| Total | 100 pounds |

This material was mixed in an intensive mixer and applied at a 20 mil thickness to the same nominal 10 mil felt used above in STRUCTURE 1. A foamable plastisol of the following formula was then applied to the surface of the hot melt calendered layer and gelled on a hot drum.

| Foamable Plastisol | | |
|---|---|---|
| PVC Plastisol resin | 48.2 | pounds |
| Primary phthalate plasticizer | 18.6 | |
| Epoxidized soy oil | 0.7 | |
| Limestone | 21.7 | |
| Diluents | 5.8 | Sum of phthalate and diluents |
| Barium stabilizer | 0.4 | is equal to 24.4 |
| Titanium dioxide | 3.6 | |
| Activated blowing agent | 1.0 | |
| Total | 100 | pounds |

A final pass was made to apply 10 mil of a plastisol wear layer of the same formula used above in STRUCTURE 1. The entire structure was then fused in a hot air impingement oven to blow the foam and fuse the wear layer. A structure with a nominal 20 mils of expanded foam resulted. This is a 2:1 blow ratio. When tested, this structure showed a can drop of 35 inches, a refrigerator drag of 156 pounds and a residual indent of 4 mils.

A sheet flooring product and process is described above. Various details of the invention may be changed without departing from its scope. Furthermore, the foregoing description of the preferred embodiment of the invention and the best mode for practicing the invention are provided for the purpose of illustration only and not for the purpose of limitation--the invention being defined by the claims.

We claim:

1. A sheet flooring product comprising:
   (a) a melt processable resin layer including a melt processable resin;
   (b) a felt layer produced by a beater saturated method, wherein the felt includes fibers and an inorganic filler, said felt layer positioned adjacent to said melt processable resin layer; and
   (c) a wear layer, wherein the sheet flooring product has a residual indent value of less than 10 mils.

2. The sheet flooring product of claim 1, wherein the sheet flooring product has a residual indent value of less than 5 mils.

3. A sheet flooring product comprising:
   (a) a melt processable resin layer including a melt processable resin;
   (b) a felt layer produced by a beater saturated method, wherein the felt includes fibers and an inorganic filler, said felt layer positioned adjacent to said melt processable resin layer; and
   (c) a wear layer, wherein the sheet flooring product has a can drop value of at least 20 inches.

4. A sheet flooring product comprising:
   (a) a melt processable resin layer including a melt processable resin;
   (b) a felt layer produced by a beater saturated method, wherein the felt includes fibers and an inorganic filler, said felt layer positioned adjacent to said melt processable resin layer; and
   (c) a wear layer, wherein the sheet flooring product has a refrigerator drag value of greater than 100 pounds.

5. A sheet flooring product comprising:
   a) a felt layer produced by a beater saturated method,
   b) a melt processable resin layer including a melt processable resin positioned adjacent a first side of said felt layer, and
   c) a second resin layer positioned adjacent a second side of said felt layer, wherein the sheet flooring product has a residual indent value of less than 10 mils.

6. A sheet flooring product comprising:

a) a felt layer produced by a beater saturated method, b) a melt processable resin layer including a melt processable resin positioned adjacent a first side of said felt layer, and c) a second resin layer positioned adjacent a second side of said felt layer, wherein the sheet flooring product has a can drop value of at least 20 inches.

7. A sheet flooring product comprising:

a) a felt layer produced by a beater saturated method, b) a melt processable resin layer including a melt processable resin positioned adjacent a first side of said felt layer, and c) a second resin layer positioned adjacent a second side of said felt layer, wherein the sheet flooring product has a refrigerator drag value of greater than 100 pounds.

* * * * *